United States Patent
Lee et al.

(10) Patent No.: US 6,281,953 B1
(45) Date of Patent: Aug. 28, 2001

(54) LIQUID CRYSTAL DISPLAY HAVING HIGH APERTURE RATIO AND HIGH TRANSMITTANCE AND METHOD OF MANUFACTURING THE SAME

(75) Inventors: Seung Hee Lee, Kyoungki-do; Seok Lyul Lee; In Cheol Park, both of Seoul, all of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/379,031

(22) Filed: Aug. 23, 1999

(30) Foreign Application Priority Data

Aug. 24, 1998 (KR) .................................................. 98-34245

(51) Int. Cl.[7] ..................................................... G02F 1/136
(52) U.S. Cl. .............................................. 349/43; 349/141
(58) Field of Search ........................................ 349/43, 141

(56) References Cited

U.S. PATENT DOCUMENTS

| | | | |
|---|---|---|---|
| 5,274,484 | 12/1993 | Mochizuki et al. | 359/55 |
| 5,995,187 | * 11/1999 | Wakagi et al. | 349/141 |
| 6,177,970 | * 1/2001 | Kim | 349/141 |

FOREIGN PATENT DOCUMENTS

| | | | |
|---|---|---|---|
| 57-161830 | 10/1982 | (JP) | G02F/1/03 |
| 04318812 | 11/1992 | (JP) . | |
| 08062586 | 3/1996 | (JP) | G02F/1/1333 |
| 08313923 | 11/1996 | (JP) | G02F/1/1343 |
| 10-48602 | 2/1998 | (JP) | G02F/1/1333 |
| 10039306 | 2/1998 | (JP) | G02F/1/1337 |
| 10048671 | 2/1998 | (JP) | G02F/1/136 |
| 10123561 | 5/1998 | (JP) | G02F/1/1347 |

\* cited by examiner

*Primary Examiner*—James A. Dudek
(74) *Attorney, Agent, or Firm*—Ladas & Parry

(57) ABSTRACT

The present invention provides a liquid crystal display having high aperture ratio and high transmittance, which prevents signal delay in the gate bus line and also improves the intensity of fringe field, and the method of manufacturing the same. The liquid crystal display is manufactured according to the steps of: forming a gate bus line and a common signal line on a lower substrate; forming a gate insulating layer on the lower substrate in which the gate bus line and the common signal line are formed; forming a channel layer on a selected portion of the gate insulating layer comprising the gate bus line; forming a source and a drain electrodes so as to overlap with both sides of the channel layer, and a data bus line being arranged perpendicular to the gate bus line; etching the gate insulating layer so as to expose a selected portion of the common signal line; forming a counter electrode by depositing an ITO layer on the gate insulating layer, and by patterning a selected portion thereof so as to contact with the exposed common signal line; depositing a passivation layer over the gate insulating layer in which the counter electrode is formed; etching the passivation layer so as to expose a selected portion of the drain electrode; and forming a pixel electrode, by depositing the ITO layer on the passivation layer so as to contact to the exposed drain electrode, and by patterning a selected portion of the ITO layer so that a fringe field is formed by being overlapped with the counter electrode.

15 Claims, 5 Drawing Sheets

LIQUID CRYSTAL DISPLAY HAVING HIGH APERTURE RATIO AND HIGH TRANSMITTANCE AND METHOD OF MANUFACTURING THE SAME

BACKGROUND OF THE INVENTION

This invention relates to a liquid crystal display and a method of manufacturing the same, more particularly to a liquid crystal display having high aperture ratio and high transmittance, which is driven by a fringe field.

DESCRIPTION OF RELATED ART

The liquid crystal display having high aperture ratio and high transmittance which is switched by the fringe field, has been proposed to improve those characteristics of low transmittance and low aperture ratio in an IPS liquid crystal display which is switched by an in-plane field parallel with substrates.

The liquid crystal display having high aperture ratio and high transmittance has a counter electrode and a pixel electrode, both made of a transparent conductor, and a distance between those electrodes is formed narrower than a distance between upper and lower substrates thereby forming a fringe field over the counter electrode and the pixel electrode.

FIG. 1 is a cross-sectional view showing a general liquid crystal display having high aperture ratio and high transmittance.

Referring to FIG. 1, an opaque metal layer for gate bus line, for example an Al-contained alloy layer or a deposition layer containing Al layer is formed on a transparent lower substrate 10 so as to reduce signal delay. A predetermined portion of the opaque metal layer for gate bus line 11 is patterned, thereby forming a gate bus line 11 and a common signal line(not shown). A transparent conductive layer, for example an ITO(indium tin oxide) is deposited over the lower substrate 10 in which the gate bus line 11 and the common signal line are formed. And then, a predetermined portion of the transparent conductive layer is patterned to be contacted with the common signal line, thereby forming a counter electrode 12 having a rectangular plate shape. A gate insulating layer 13 is formed over the lower substrate 10 in which the gate bus line 11 and the counter electrode 12 are formed. An amorphous silicon layer 14 is deposited over the gate insulating layer 13 so as to overlap with a selected portion of the gate bus line 11. An etch stopper 15 is formed over the amorphous silicon layer 14 to correspond with a predetermined portion of the gate bus line 11. An impurity-doped amorphous silicon layer 16 is deposited over the amorphous silicon layer 14. Predetermined portions of the amorphous silicon layer 14 and the impurity-doped amorphous silicon layer 16 are patterned, thereby forming a channel layer and an ohmic layer. A metal layer for data bus line, for example an Mo/Al/Mo layer is deposited over the gate insulating layer 13 and the metal layer is patterned to be remained at both sides of the channel layer, thereby forming source and drain electrodes 17a,17b. Accordingly, a thin film transistor is completed.

A transparent conductive layer is deposited over the gate insulating layer 13 in which the source and the drain electrodes 17a,17b are formed. A predetermined portion of the transparent conductive layer is patterned to overlap with the counter electrode 12, thereby forming a pixel electrode 18. At this time, the pixel electrode 18 is formed in the shape of a comb so that the pixel electrode 18 makes a fringe field together with the counter electrode 12. To protect the thin film transistor and the pixel electrode 18, a passivation layer 19 is formed on the gate insulating layer 13.

A transparent upper substrate 100 is opposed to the lower substrate 10 by a selected distance. A black matrix 101 is formed at an inner side of the upper substrate 100 so as to correspond to the thin film transistor, and a color filter 102 is formed at one side of the black matrix so as to correspond to the pixel electrode 18. A first alignment layer 104a is formed on surfaces of the black matrix 101 and the color filter 102. A second alignment layer 104b is formed on a surface of the passivation layer 19. A liquid crystal layer 105 is sandwiched at a space between the upper substrate 100 and the lower substrate 10.

However, the conventional liquid crystal display having high aperture ratio and high transmittance incurs following problems.

The Al-contained alloy layer for consisting the gate bus line and the ITO material consisting the counter electrode have similar etching selectivity. Therefore, when the counter electrode is formed, the gate bus line and the common signal line may be lost or damaged by an ITO etchant. When the gate bus line is lost, thus resistance of the gate line is increased and also the signal delay time is increased. To solve foregoing problems, an MoW material which does not react to the ITO etchant has been used for the gate bus line. However, this MoW material has higher resistance than the Al-contained alloy layer, the signal delay is still occurred.

Furthermore, the fringe field E formed between the counter electrode 12 and the pixel electrode 18, drives liquid crystal molecules of the liquid crystal layer. At this time, a path that the substantial fringe field is formed, is as follows; the passivation layer 19, the second alignment layer 104b, the liquid crystal layer 105, the second alignment layer 104b and the gate insulating layer 13. Like this, since there is formed a multi-layered insulating layer in the spaces where the fringe field is formed, intensity of the fringe field is very low. Accordingly, a relatively high voltage is required to obtain a predetermined degree of the fringe field intensity, and an afterimage may be shown.

SUMMARY OF THE INVENTION

Therefore, it is one object of the present invention to provide a liquid crystal display having high aperture ratio and high transmittance, and also capable of preventing the signal delay in a gate bus line.

Further, it is another object of the present invention to provide a liquid crystal display having high aperture ratio and high transmittance, and also capable of improving the intensity of fringe field without requiring high voltage.

It is still an object of the present invention to provide a method of manufacturing the liquid crystal display having high aperture ratio and high transmittance.

To accomplish foregoing objects of the present invention, the method of manufacturing the liquid crystal display includes the steps of: forming a gate bus line and a common signal line on a lower substrate; forming a gate insulating layer on the lower substrate in which the gate bus line and the common signal line are formed; forming a channel layer on a selected portion of the gate insulating layer comprising the gate bus line; forming a source and a drain electrodes so as to overlap with both sides of the channel layer, and a data bus line being arranged perpendicular to the gate bus line; etching the gate insulating layer so as to expose a selected portion of the common signal line; forming a counter electrode by depositing an ITO layer on the gate insulating layer, and by patterning a selected portion thereof so as to contact with the exposed common signal line; depositing a passivation layer over the gate insulating layer in which the counter electrode is formed; etching the passivation layer so as to expose a selected portion of the drain electrode; and forming a pixel electrode, by depositing the ITO layer on the passivation layer so as to contact to the exposed drain electrode, and by patterning a selected portion of the ITO layer so that a fringe field is formed by being overlapped with the counter electrode.

In another aspect of the present invention, the liquid crystal display includes: a gate bus line and a common signal line, both disposed on a surface of a lower substrate; a gate insulating layer coated over the lower substrate in which the gate bus line and the common signal line are formed; a thin film transistor formed on a selected portion of the gate bus line; a counter electrode contacted with the common signal line, disposed at a selected portion on the gate insulating layer and made of an ITO material; a passivation layer formed on the gate insulating layer so as to cover the thin film transistor and the counter electrode; and a pixel electrode contacted with a selected portion of the thin film transistor, formed on the passivation layer so as to overlap with the counter electrode, and making a fringe field together with the counter electrode and made of the ITO material.

DETAILED DESCRIPTION OF THE PREFERRED EMBODIMENTS

Hereinafter, the preferred embodiments of the present invention will be discussed with reference to attached drawings.

Figure 1:
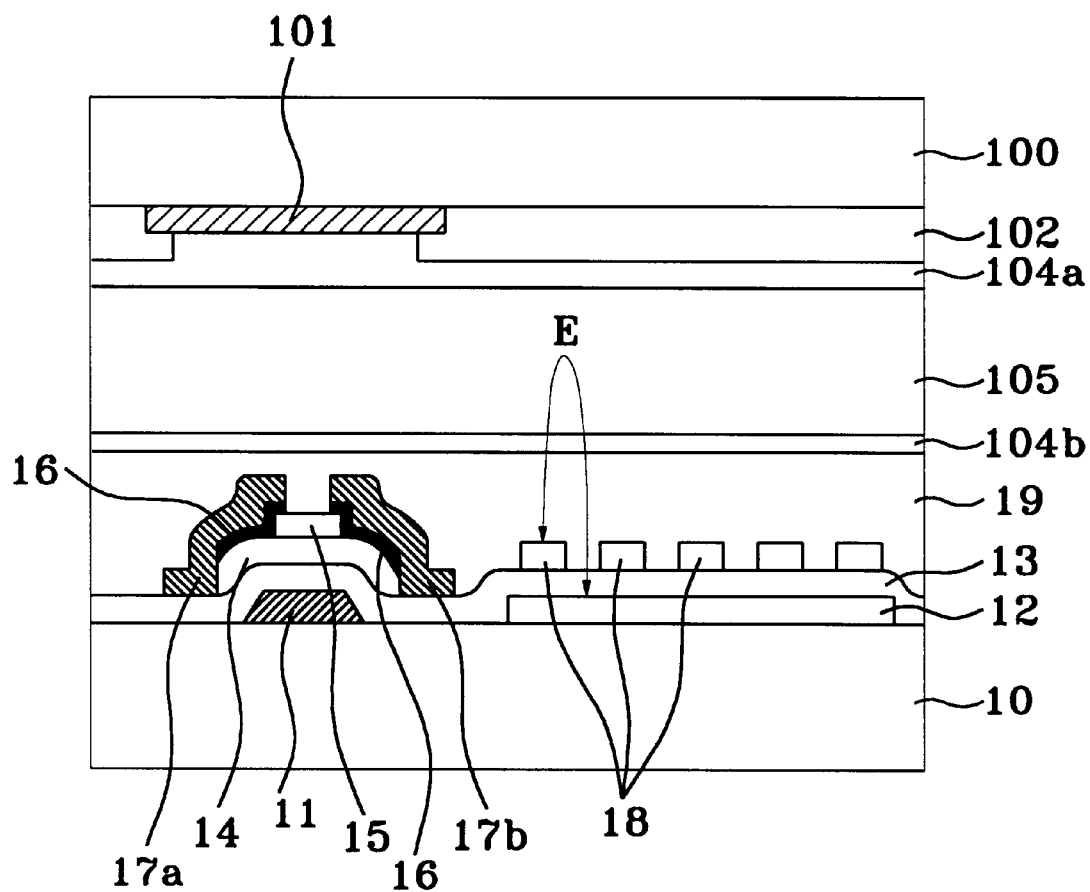
FIG. 1 is a cross-sectional view showing a general liquid crystal display having high aperture ratio and high transmittance.
Figure 2:
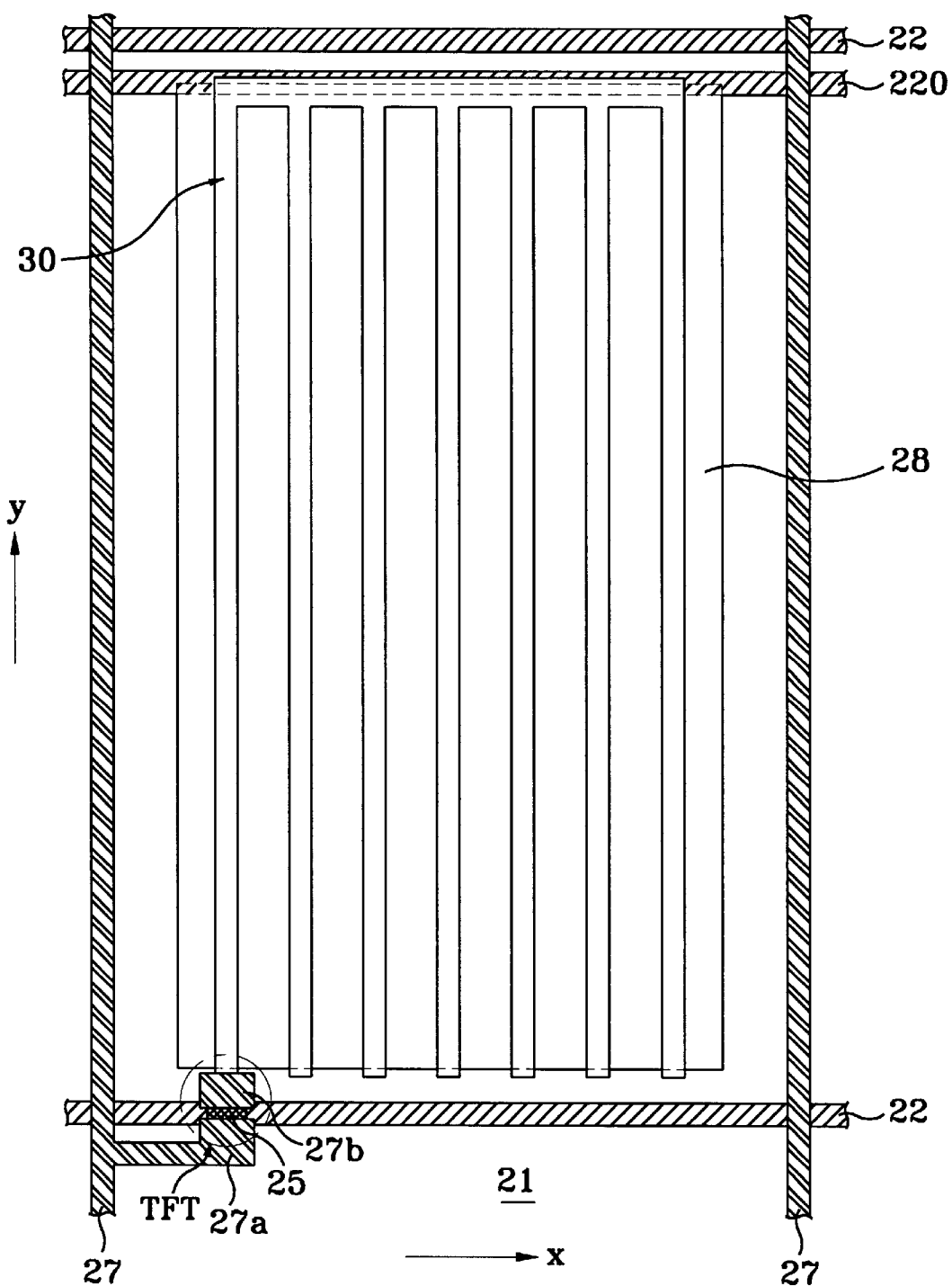
FIG. 2 is a plan view showing a liquid crystal display having high aperture ratio and high transmittance according to the present invention.

FIG. 2 is a plan view showing a liquid crystal display having high aperture ratio and high transmittance according to the present invention. FIGS. 3A to 3D are schematic cross-sectional views showing the manufacturing process of the liquid crystal display having high aperture ratio and high transmittance according to the present invention. FIG. 4 is a plan view showing a liquid crystal display having high aperture ratio and high transmittance according to another embodiment of the present invention.

Figure 3A:
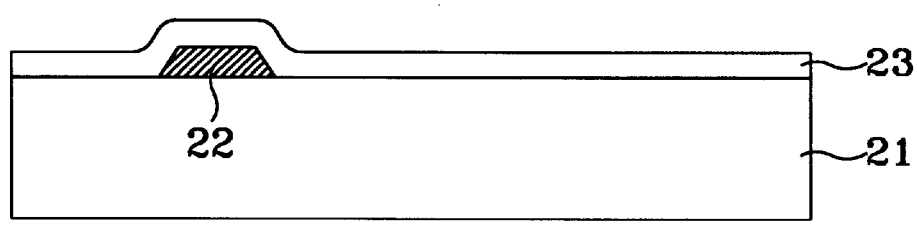
FIGS. 3A to 3D are schematic cross-sectional views showing the manufacturing process of the liquid crystal display having high aperture ratio and high transmittance according to the present invention.
Figure 4:
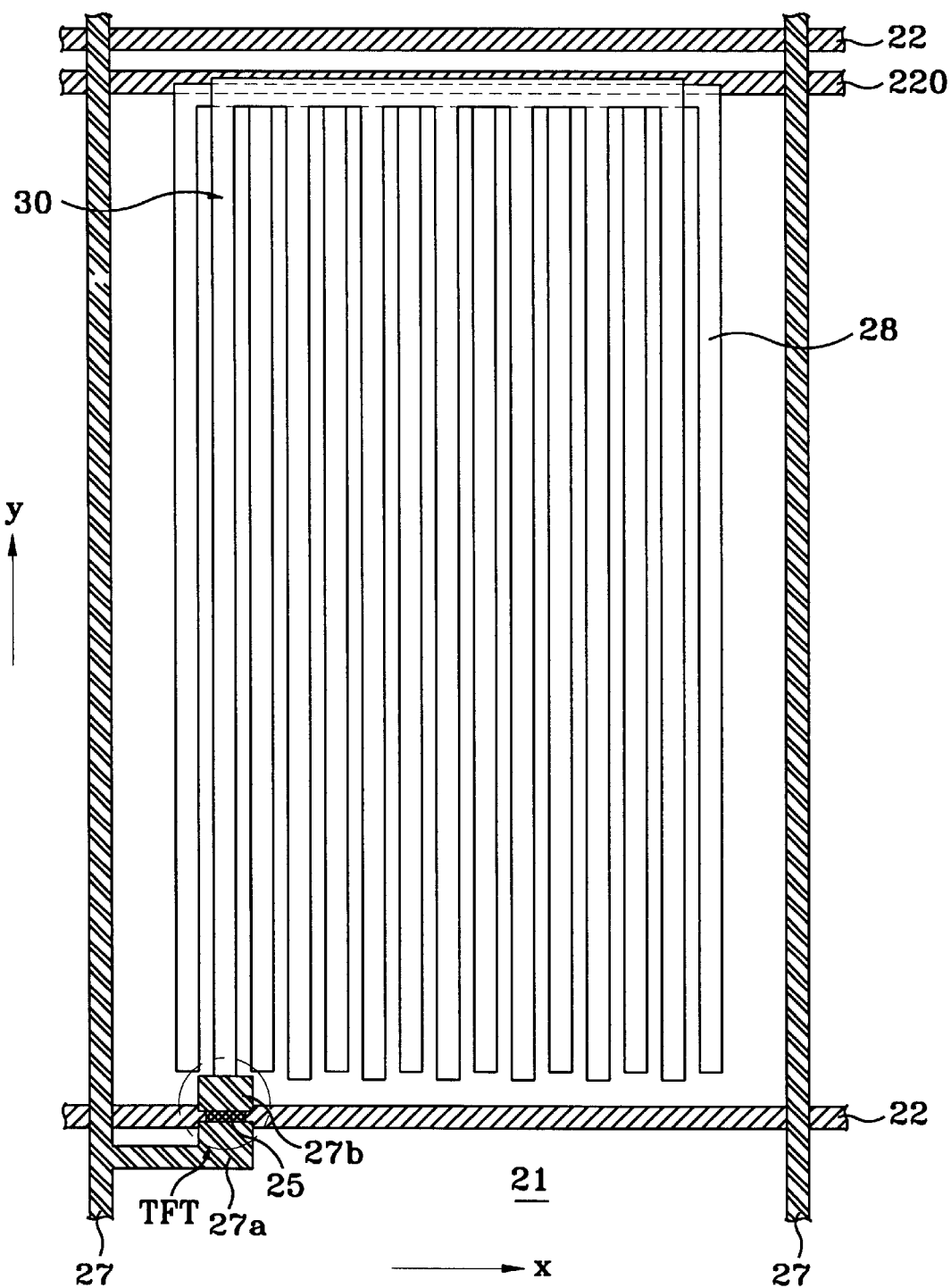
FIG. 4 is a plan view showing a liquid crystal display having high aperture ratio and high transmittance according to another embodiment of the present invention.

Referring to FIG. 2 and FIG. 3A, a metal layer for gate bus line, for example an Al-contained alloy layer or a deposition layer containing Al layer such as AlNd, Al or Mo/Al, both having low resistance is deposited on a lower substrate 21 by a thickness of 2500~3500 Å. Afterward, a selected portion of the metal layer is patterned, thereby forming a gate bus line 22 and a common signal line 220. Herein, the gate bus line 22 and the common electrode line 220 are formed as straight lines parallel with the X-axis direction. Afterward, a gate insulating layer 23 is formed over the lower substrate 21 in which the gate bus line 22 and the common signal line 220 are formed. The gate insulating layer 23 is formed with a silicon oxide layer and a silicon nitride layer, and is deposited with thickness of approximately 3500~4500 Å.

Figure 3B:
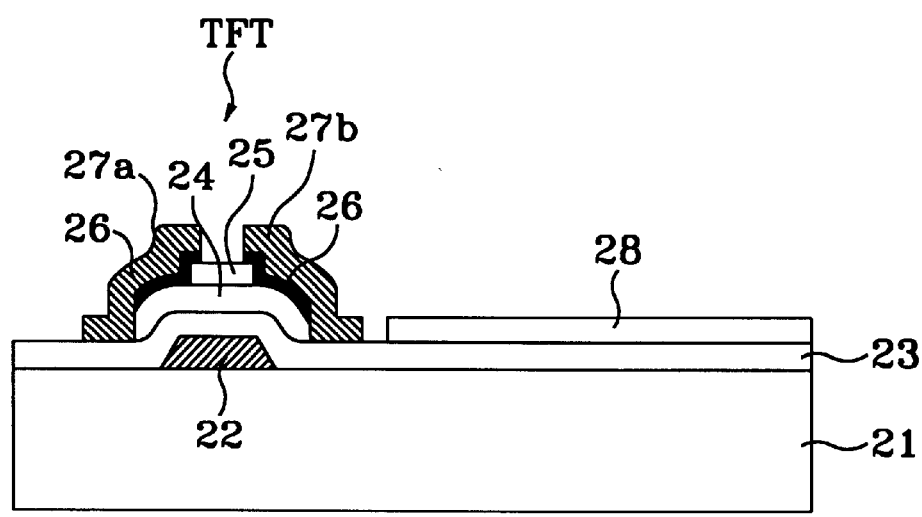

Continuously referring to FIG. 2 and FIG. 3B, an amorphous silicon layer 24 for channel and an insulating layer 25 for etch stopper are formed successively on the gate insulating layer 23. Next, an etch stopper is formed by patterning a selected portion of the insulating layer for etch stopper so as to correspond with a selected portion of the gate bus line 22. Afterward, an impurity-doped amorphous silicon layer 26 is deposited over the amorphous silicon layer 24 for channel. The impurity-doped amorphous silicon layer 26 and the amorphous silicon layer 24 for channel are patterned such that there is formed a predetermined region in which a thin film transistor is formed later, thereby forming an ohmic contact layer and a channel layer. Next, a metal layer for data bus line is deposited by thickness of approximately 4000~4500 Å. Herein, the metal layer for data bus line is made of a metal layer having excellent etching selectivity with respect to the ITO etchant and also having high conductivity, for example an Mo/Al/Mo alloy layer. And then, a selected portion of the metal layer for data bus line is patterned, thereby forming source and drain electrodes 27a,27b and a data bus line 27. Herein, the source and the drain electrodes 27a,27b are formed to be overlapped with both sides of the channel layer 24, and the data bus line 27 is formed in the Y-axis direction which is perpendicular to the gate bus line 22. In addition, a selected portion of the ohmic contact layer is also patterned when the source and the drain electrodes 27a,27b are formed, so that the ohmic contact layer becomes a part of the source and the drain electrodes 27a,27b. Consequently, a thin film transistor TFT is completed and a sub pixel region of a lattice shape is defined.

Afterward, a selected portion of the gate insulating layer 23 is etched so that a selected portion of the common signal line and an electrode pad of the liquid crystal display are exposed. An ITO layer is deposited on the gate insulating layer 23 of the lower substrate 21 in which the thin film transistor TFT is formed, by thickness of approximately 300~500 Å so that the ITO layer for counter electrode is contacted to the exposed electrode pad and the common signal line. A selected portion of the ITO layer is patterned by the ITO etchant, thereby forming a counter electrode 28. The counter electrode 28 is formed at each sub pixel region and is also contacted with the common signal line 220 respectively. As shown in FIG. 2, the counter electrode 28 can have a rectangular plate shape, and the counter electrode 28 also can have a comb shape as shown in FIG. 4. Herein, since the gate bus line 22 is buried in the gate insulating layer 23 during an etching process for forming the counter electrode 28, the etchant for forming the counter electrode 28 does not have much influence thereon although the gate bus line 22 is made of an Al-contained alloy layer or a deposition layer containing Al layer. Additionally, the data bus line 27 is made of the Mo/Al/Mo layer which has not much influence from the ITO etchant, and the data bus line can be protected from being lost or damaged by forming the counter electrode 28.

Figure 3C:
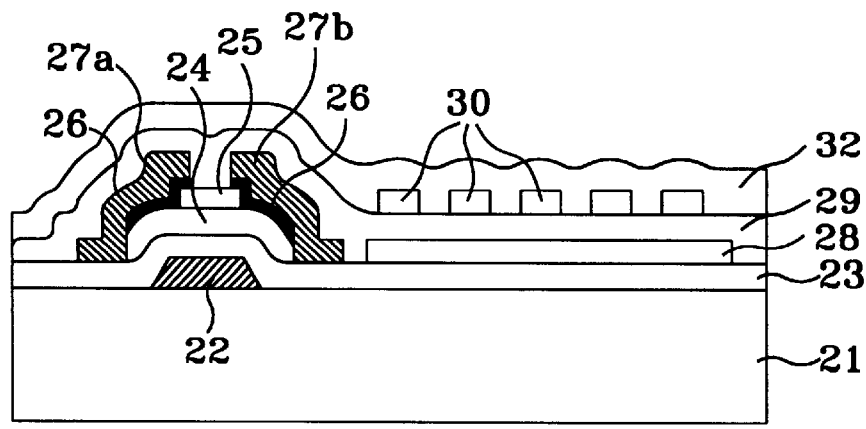

As shown in FIGS. 2 and 3C, a passivation layer 29 is formed on the gate insulating layer 23 in which the thin film transistor TFT and the counter electrode 28 are formed. At this time, a silicon nitride layer can be used for the passivation layer 29, and the passivation layer 29 has a thickness of approximately 1500~2500 Å. A selected portion of the passivation layer 29 is patterned so as to expose the drain electrode 27b of the thin film transistor TFT. On the passivation layer contacted with the exposed drain electrode 27b, a selected portion of the ITO layer is patterned to be overlapped with the counter electrode 28, thereby forming a pixel electrode 30. At this time, the pixel electrode 30 has the comb shape. Herein, the counter electrode 28 can be shown through a gap between teeth 31 consisting of the pixel electrode of the comb shape. Afterward, a homogeneous alignment layer 32 is formed on the passivation layer 29 in which the pixel electrode 30 is formed.

Figure 3D:
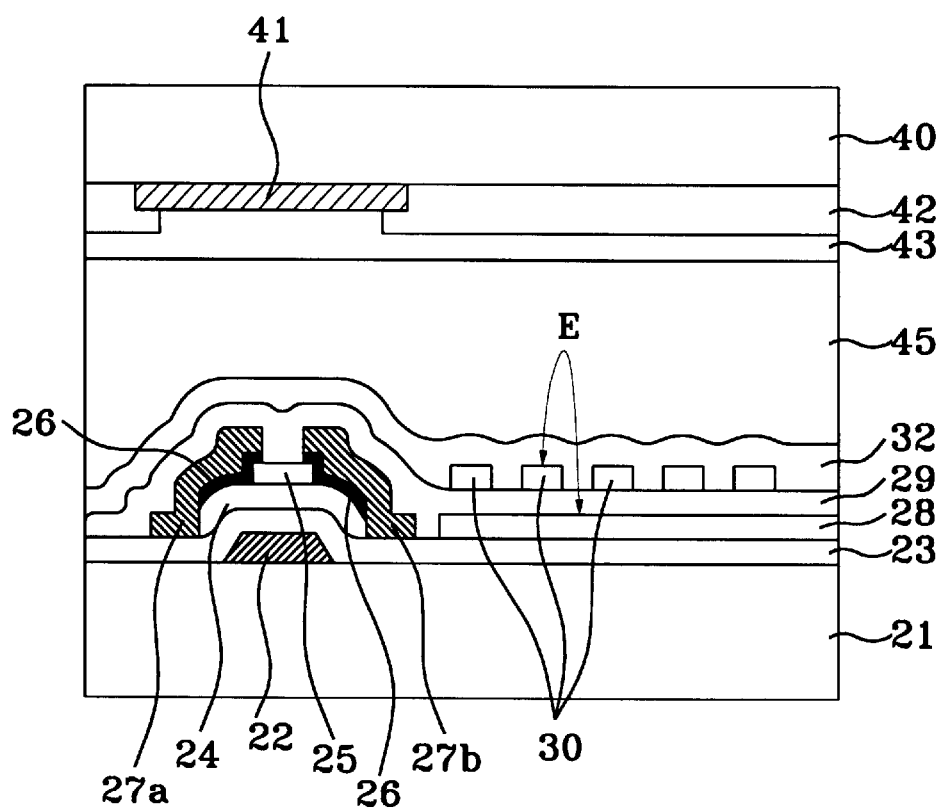

Next, as shown in FIG. 3D, an upper substrate 40 is attached to be opposed to the lower substrate 21. Herein, a black matrix 41 is formed at an inner side of the upper substrate 40 so as to correspond to the thin film transistor TFT, and a color filer 42 is formed at both sides of the black matrix 41 so as to correspond to the pixel electrode 30. Another homogeneous alignment layer 43 is formed at surfaces of the black matrix 41 and the color filter 42. A liquid crystal layer 45 is sandwiched between the lower substrate 21 and the upper substrate 40.

At this time, those homogeneous alignment layers 32, 43 have their own rubbing axes of selected directions, and these rubbing axes are anti-parallel to each other. At this time, the rubbing axis of the homogeneous alignment layer 32 in the lower substrate makes a selected angel with respect to a projection face of an electric field, and the index of dielectric anisotropy of liquid crystal molecules is determined according to this angle. For example, a material having positive dielectric anisotropy can be used when the angle of the rubbing axis of the homogeneous alignment layer 32 and the projection face is over 45 degrees, and a material having negative dielectric anisotropy can be used when the angle is below 45 degrees. Further, although not shown in the drawings, there are formed polarizers at the respective backsides of the substrates. At this time, the polarizers have the respective polarizing axes and these polarizing axes are crossed each other. Furthermore, it is preferable that the polarizing axis of the polarizer formed in the lower substrate is parallel with the rubbing axis of the homogeneous alignment layer 32 of the lower substrate 21.

Additionally, a distance between the pixel electrode 30 and the counter electrode 28 is formed narrower than a distance between the upper and the lower substrates, i.e. the thickness of the liquid crystal layer so as to form a fringe field between the pixel electrode 30 and the counter electrode 28.

When voltage is applied between the counter electrode 28 and the pixel electrode 30 of this liquid crystal display, the fringe field E is formed. At this time, the fringe field is formed between the lower alignment layer 32, the liquid crystal layer 45 and the passivation layer 29. Therefore, a path of the fringe field in the present invention is shorter than the conventional path of the fringe field; through the passivation layer, the lower alignment layer, the liquid crystal layer, the lower alignment layer, the passivation layer to the gate insulating layer. Since the path of the fringe field is short in the present invention, the fringe field having superior intensity to the conventional fringe field is obtained when a degree of the voltage as applied to the pixel and the counter electrodes is equal to the conventional one. Therefore, even lower voltage is required to obtain an electric field having equal intensity to the conventional one. Accordingly, operation with lower voltage is available.

As disclosed in the above specification, the gate bus line is made of the Al-contained alloy layer or a deposition layer containing Al layer having excellent conductivity, and the counter electrode is formed on the gate insulating layer after the gate bus line is formed. Therefore, the gate bus line does not have much influence from the ITO etchant during forming the counter electrode. The gate bus line is protected from being lost or damaged, thereby preventing signal delay in the gate bus line. The signal delay is further prevented since the gate bus line is made of the Al-contained alloy layer or a deposition layer containing Al layer having high conductivity.

Also, the counter electrode is formed on the gate insulating layer, and the pixel electrode is formed on the passivation layer, thereby shortening the path of fringe field compared with the conventional path. Consequently, a selected intensity of the fringe field can be obtained by a driving voltage that is lower than the conventional driving voltage.

Although preferred embodiment of the present invention is described and illustrated, various other modifications will be apparent to and can be readily made by those skilled in the art without departing from the scope and spirit of the present invention.

What is claimed is:

1. A method of manufacturing a liquid crystal display having high aperture ratio and high transmittance comprising the steps of:

forming a gate bus line and a common signal line on a lower substrate;

forming a gate insulating layer on the lower substrate in which the gate bus line and the common signal line are formed;

forming a channel layer on a selected portion of the gate insulating layer comprising the gate bus line;

forming a source and a drain electrodes so as to overlap with both sides of the channel layer, and a data bus line being arranged perpendicular to the gate bus line;

etching the gate insulating layer so as to expose a selected portion of the common signal line;

forming a counter electrode by depositing an ITO layer on the gate insulating layer, and by patterning a selected portion thereof so as to contact with the exposed common signal line;

depositing a passivation layer over the gate insulating layer in which the counter electrode is formed;

etching the passivation layer so as to expose a selected portion of the drain electrode; and forming a pixel electrode, by depositing the ITO layer on the passivation layer so as to contact to the exposed drain electrode, and by patterning a selected portion of the ITO layer so that a fringe field is formed by being overlapped with the counter electrode.

2. The method of claim 1, after the step of forming the pixel electrode, further comprising a step of forming a homogeneous alignment layer on the passivation layer in which the pixel electrode is formed.

3. The method of claim 1, wherein the step of forming the channel layer further comprises the steps of: depositing an amorphous silicon layer; forming an etch stopper on the amorphous silicon layer so as to correspond with the gate bus line; forming an impurity-doped amorphous silicon layer on the etch stopper and on the amorphous silicon layer; and patterning selected portions of the impurity-doped amorphous silicon layer and the amorphous silicon layer.

4. The method of claim 1, wherein the gate insulating layer is formed by depositing a silicon oxide layer and a silicon nitride layer.

5. The method of claim 1, wherein the gate bus line and the common signal line are made of an Al-contained alloy layer or a deposition layer containing Al layer.

6. The method of claim 1, wherein the data bus line is made of a material having excellent etching selectivity to an ITO etchant.

7. The method of claim 6, wherein the data bus line is made of an Mo/Al/Mo metal layer.

8. A liquid crystal display having high aperture ratio and high transmittance comprising:
- a gate bus line and a common signal line, both disposed on a surface of a lower substrate;
- a gate insulating layer coated over the lower substrate in which the gate bus line and the common signal line are formed;
- a thin film transistor formed on a selected portion of the gate bus line;
- a counter electrode contacted with the common signal line, disposed at a selected portion on the gate insulating layer and made of an ITO material;
- a passivation layer formed on the gate insulating layer so as to cover the thin film transistor and the counter electrode; and
- a pixel electrode contacted with a selected portion of the thin film transistor, formed on the passivation layer so as to overlap with the counter electrode, and making a fringe field together with the counter electrode and made of the ITO material.

9. The liquid crystal display of claim 8, wherein the counter electrode has a shape of rectangular plate or a shape of comb.

10. The liquid crystal display of claim 9, wherein the pixel electrode has a shape of comb, and the counter electrode is exposed by spaces between teeth of the pixel electrode having the comb shape.

11. The liquid crystal display of claim 8, wherein the gate insulating layer is formed by depositing a silicon oxide layer and a silicon nitride layer.

12. The liquid crystal display of claim 8, wherein the gate bus line and the common signal line are made of an Al-contained alloy layer or a deposition layer containing Al layer.

13. The liquid crystal display of claim 8, wherein the data bus line is made of a material having excellent etching selectivity with respect to an ITO etchant.

14. The liquid crystal display of claim 13, wherein the data bus line is made of an Mo/Al/Mo metal layer.

15. The liquid crystal display of claim 8, further comprising an alignment layer on the passivation layer in which the pixel electrode is formed.

* * * * *